United States Patent
Ramalingam et al.

(10) Patent No.: US 10,133,775 B1
(45) Date of Patent: Nov. 20, 2018

(54) RUN TIME PREDICTION FOR DATA QUERIES

(71) Applicant: AMAZON TECHNOLOGIES, INC., Reno, NV (US)

(72) Inventors: Harsha Ramalingam, Kirkland, WA (US); Ramanathan Muthiah, Issaquah, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 757 days.

(21) Appl. No.: 14/219,802

(22) Filed: Mar. 19, 2014

(51) Int. Cl.
G06F 17/30 (2006.01)

(52) U.S. Cl.
CPC .. G06F 17/30442 (2013.01); *G06F 17/30306* (2013.01); *G06F 17/30463* (2013.01)

(58) Field of Classification Search
CPC ................... G06F 17/30463; G06F 17/30306
See application file for complete search history.

(56) References Cited

U.S. PATENT DOCUMENTS

| | | | |
|---|---|---|---|
| 7,636,735 B2 * | 12/2009 | Haas | G06F 17/30935 |
| 8,499,066 B1 * | 7/2013 | Zhang | H04L 47/823 |
| | | | 709/200 |
| 2002/0166112 A1 * | 11/2002 | Martin | G06F 11/3447 |
| | | | 717/124 |
| 2003/0065648 A1 * | 4/2003 | Driesch, Jr. | G06F 17/30469 |
| 2007/0022136 A1 * | 1/2007 | Keller | G06F 17/30469 |
| 2008/0177722 A1 * | 7/2008 | Lohman | G06F 17/30979 |
| 2008/0229140 A1 * | 9/2008 | Suzuki | G06F 17/30368 |
| | | | 714/2 |
| 2008/0270346 A1 * | 10/2008 | Mehta | G06F 17/30463 |
| 2013/0226903 A1 * | 8/2013 | Wu | G06F 17/30463 |
| | | | 707/719 |
| 2014/0156735 A1 * | 6/2014 | Yamasaki | H04L 69/28 |
| | | | 709/203 |

* cited by examiner

*Primary Examiner* — Albert M Phillips, III
*Assistant Examiner* — Raheem Hoffler
(74) *Attorney, Agent, or Firm* — Lindauer Law, PLLC

(57) ABSTRACT

Techniques are described for modeling data query execution time based on a cost of data queries, where the cost provides a measure of the processing resources used by the data query while executing. Using regression analysis or other statistical methods, a model may be generated that enables the prediction of the query execution time based on the query cost. In some cases, the model may be generated based on a linear regression analysis of previously measured execution times and previously determined data query costs. The model may be stored and employed prior to, or during, the subsequent execution of a data query, to predict the execution time of the data query. Data queries that execute substantially longer than the predicted execution time may be terminated.

20 Claims, 10 Drawing Sheets

RUN TIME PREDICTION FOR DATA QUERIES

BACKGROUND

An organization engaged in software development, electronic commerce, or other types of services may generate and consume a large quantity of data regarding operations of the organization. Such data may be analyzed through the execution of any number of jobs, and the results of such jobs may be provided to data consumers who are internal to or external to the organization. Because the results of the executed jobs may be employed in making decisions regarding business operations such as marketing, inventory management, system design, personnel, and so forth, delays or failures in job execution may delay or otherwise adversely affect such decision making.

Figure 1:
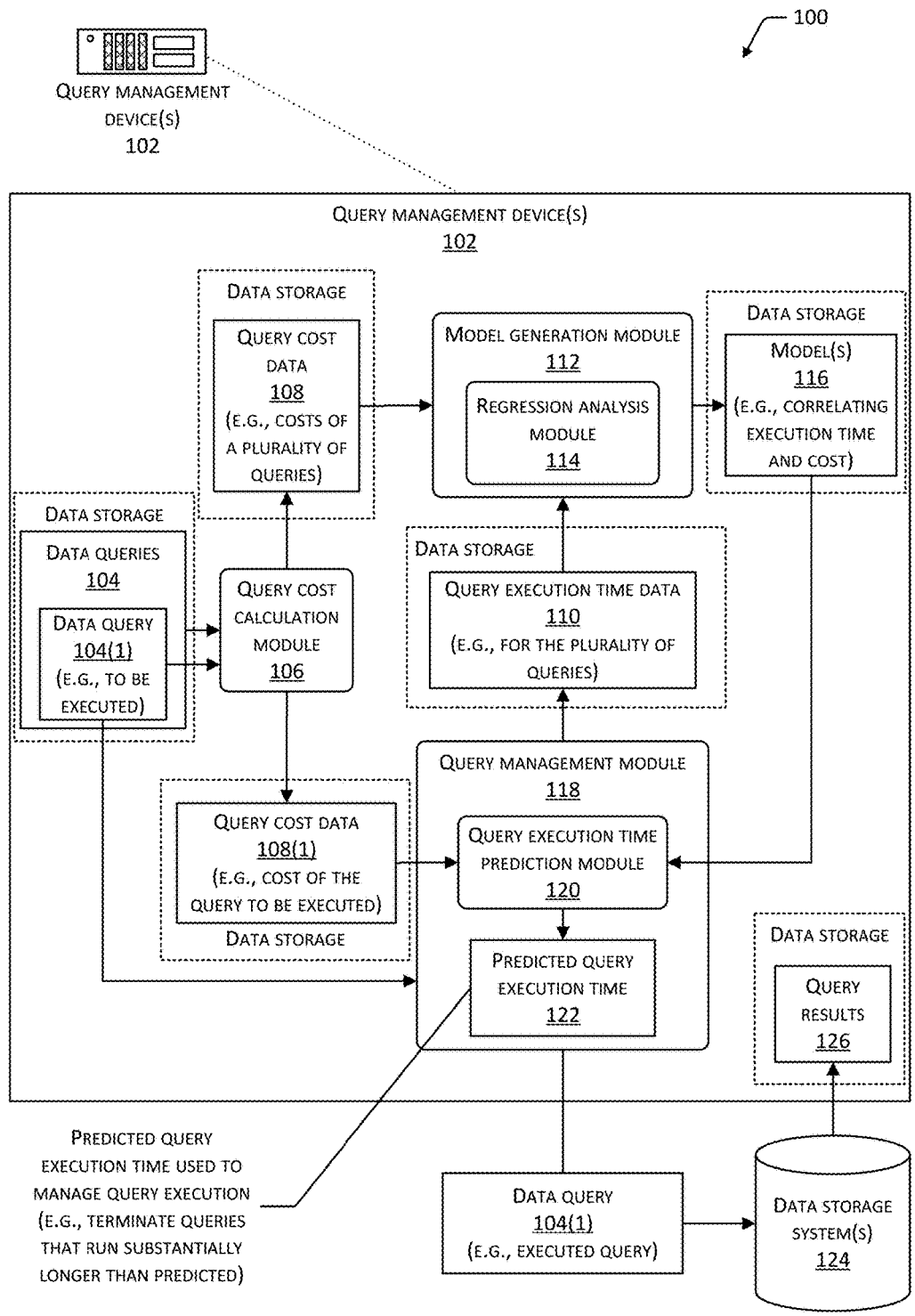
FIG. 1 depicts an environment including one or more query management devices that perform operations to generate a model for prediction of data query execution times based on data query costs, and to employ the model to manage data query execution.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for generating a model for predicting data query execution times. The model may be based on correlating query cost data and historical query execution time data. In some implementations, the correlation may use data resulting from execution on a common grouping of resources, such as a particular server cluster. The execution of a plurality of data queries may be monitored to measure the execution time of each of the queries, the execution time being the time period from a start time of the execution of a query to an end time when the query completes or otherwise terminates. The measured execution times for the plurality of queries may be stored as query execution time data.

For each of the plurality of data queries, a cost of the data query may be determined. In some implementations, the cost of a data query provides a measure of the amount of processing resources of a data storage system that the data query may consume when executed on the data storage system. For example, the cost of a data query may describe a proportion (e.g., percentage) of central processing unit (CPU) processing capacity predicted to be employed by the data query while it is executing. In some cases, the cost may be determined based on a number of tables being joined or otherwise accessed during execution of the data query, the complexity of operations performed by the data query, or the type of operations performed by the data query. The cost may also be based, at least in part, on a cardinality of the data stored in one or more data attributes (e.g., columns) accessed by the data query. The cardinality of the data in a column may describe the uniqueness of the data. For example, a column with higher cardinality may have a larger number of data values that are unique in the column, such as where the column is a primary key of a table. A column with lower cardinality may have a larger number of data values that are shared among multiple rows and therefore not unique. Accordingly, the cardinality of a column may predict the number of rows resulting from the data query executed against the column. In some cases, the cost of a data query may also be based on whether the one or more tables accessed by the data query have one or more indices. In some implementations, the cost may be determined through the use of a command supported by the data storage system on which the data query executes. For example, if the data storage system is managed using the Oracle™ Database provided by the Oracle™ Corporation of Redwood City, Calif., USA, the cost may be output in response to an "EXPLAIN PLAN" command entered at a command line interface of the data storage system. The costs of the plurality of data queries may be stored as query cost data.

The cost of a data query may not account for the environment where the data query is executed, such as the hardware configuration, software configuration, clustering, processing capacity, memory, or storage capacity of the data storage systems. Moreover, the cost of a data query also may not account for current conditions on the data storage system when the data query is executing, such as the other jobs that may be executing and competing with the data query for resources on the data storage system. Accordingly, the cost of a data query may not be directly employed as a measure of the execution time of the data query. For example, a data query with a particular cost may run longer on a first data storage system than on a second data storage system, given the different characteristics or job loads of the two data storage systems.

In implementations, the query execution time data and the query cost data for a plurality of data queries may be correlated to generate a model that enables the execution time of a data query to be predicted based on the cost of the data query. In some implementations, the correlation of the query execution time data and the query cost data may employ a regression analysis that is a statistical process for modeling a relationship between the query cost data (e.g., as an independent variable) and the query execution time data (e.g., as a dependent variable). Accordingly, the model may be expressed as a mathematical formula $T_e=f(C)$, where $T_e$ is the estimated execution time of a data query and C is the cost of the data query. In some implementations, the regression analysis may be a linear regression analysis in which f (C) may be expressed as a linear combination of parameters based on the cost C. The parameters may be linear or non-linear with regard to the cost C. The model produced by the linear regression analysis may be expressed as a linear combination of parameters that may include exponential factors (e.g., parameters that are exponential with regard to C). For example, the model may be expressed as $T_e=K_1 e^{K_2 C}+K_3$, where $T_e$ is the estimated execution time of a data query, C is the cost of the data query, and ($K_1$, $K_2$, $K_3$) are coefficients (e.g., constants).

The regression analysis may be applied to data from a homogenous source, such as a common grouping of hardware used to execute the data queries. For example, the set of combined query cost and execution time data may be acquired and processed to generate the model of a particular cluster of server hardware.

Although various examples herein may describe the regression analysis as a linear regression analysis, implementations may employ any type of regression analysis method, including but not limited to: least squares, linear model, polynomial regression, simple regression, discrete choice, nonlinear regression, and so forth. Implementations may also employ other types of statistical or non-statistical analyses to determine a model based on the query cost data and the query execution time data for a plurality of data queries.

In some implementations, the query execution time data may be gathered for any number of execution instances of one or more data queries over a particular (e.g., recent) time period such as the last 30 days, the last 90 days, during a particular month, during a particular week, and so forth. The query cost data may be periodically determined (e.g., daily, weekly, etc.) for one or more data queries. The model may then be generated periodically (e.g., every 30 days, every 90 days, etc.) to correlate the query execution time data and the query cost data. In some cases, the model may be associated with the one or more particular data storage systems on which the query execution time data was collected. Accordingly, the model may enable the query execution time to be predicted for a data query executing on the particular data storage system(s) associated with the model.

In some implementations, the model may be employed to manage the execution of a data query. For example, the model may be employed to predict the query execution time of a data query that is to be executed on one or more data storage systems. The data query may then be executed and monitored to determine how long it is executing. If the data query executes longer than its predicted execution time, or longer than a time period that is based on the predicted execution time, the data query may be designated as a runaway process or otherwise faulty, and may be terminated. In some cases, the model may include a variance that characterizes a distribution of the query cost data and the query execution time data with respect to the model (e.g., as a deviation, width, or spread of the data relative to the model). In such cases, the data query may be terminated if it runs longer than a time period that is the sum of the predicted execution time and a multiplicative factor times the variance. For example, the time period may be expressed as $T=K \times \sigma + T_e$, where T is the time period allotted for execution of the data query, K is a constant multiplicative factor, σ is the variance, and $T_e$ is the estimated execution time of the data query based on the model and the query cost. By providing an estimate of the execution time of a data query based on its cost, implementations enable the execution of the data query to be managed to mitigate the risk that a data query may execute indefinitely (e.g., as a runaway process) and negatively impact other jobs and processes.

Implementations support the use of a model to predict the query execution time for any type of data query. A data query may include any number of operations to retrieve, store, modify, or delete any amount of data stored in one or more data storage systems. A data query may also include any number of operations to process data retrieved from the data storage system(s). A data query may be expressed in a query language, such as any version of a Structured Query Language (SQL). A data query may also be expressed using other programming languages or other models, including but not limited to: a MapReduce model; or the Hadoop™ Query Language (HQL) provided by the Apache™ Software Foundation.

FIG. 1 depicts an environment 100 including one or more query management devices 102 configured to generate a model that enables prediction of data query execution times based on data query costs. The query management device(s) 102 may also be configured to employ the model to manage data query execution. The query management device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. In some cases, two or more of the query management devices 102 may comprise a cluster, cloud, farm, or other grouping of multiple devices that coordinate operations to provide load balancing, failover support, parallel processing capabilities, shared storage resources, or other aspects. Although examples herein may describe the query management device(s) 102 as physically separate devices, implementations are not so limited. In some cases, the query management device(s) 102 may include one or more of a virtual computing environment, a hypervisor, a device emulation, or a virtual machine executing on one or more physical computing devices. The query management device(s) 102 are described further with reference to FIG. 5.

The query management device(s) 102 may store, or otherwise have access to, one or more data queries 104 that are executable on one or more data storage systems. In some implementations, the query management device(s) 102 may execute a query cost calculation module 106 which determines a cost of each of one or more of the data queries 104. The cost(s) may be included in query cost data 108, which may be stored on the query management device(s) 102. In some implementations the query cost data 108 may comprise a normalized value or an index of the cost. The query cost data 108 may be normalized such that values from different data storage systems 124 are comparable. A particular data query 104 may be used as a control and executed across several different data storage systems 124 to determine the normalization. The query management device(s) 102 may also store, or otherwise have access to, query execution time data 110 that describes measured execution times for one or more execution instances of one or more of the data queries 104. As described above, the query execution time data 110 may be collected over a period of time (e.g., a recent 30 day time period) by monitoring the execution of the data queries 104 on one or more data storage systems. The query execution time data 110 may include execution times for multiple execution instances of a single data query 104, execution times for individual execution instances of multiple data queries 104, or execution times for multiple execution instances of multiple data queries 104.

The query management device(s) 102 may execute a model generation module 112. The model generation module 112 may access the query cost data 108 and the query execution time data 110, and generate one or more models 116 based on a correlation of the query cost data 108 and the query execution time data 110. Access to the query cost data 108 and the query execution time data 110 may be limited to data acquired from a single grouping of resources, such as a particular server cluster. In some cases, the model generation module 112 may include a regression analysis module 114 that performs a regression analysis to generate the model(s) 116. The regression analysis module 114 may employ a linear regression analysis, a non-linear regression analysis, or another type of regression analysis to generate the model(s) 116. Although the regression analysis module 114 is described herein as a sub-module, sub-component, or sub-process of the model generation module 112, implementations are not so limited. In some implementations the regression analysis module 114 may execute separately from the model generation module 112. The model(s) 116 may be stored in memory on the query management device(s) 102. Operations of the model generation module 112 to generate the model(s) 116 are described further with reference to FIGS. 2-4 and 6-8.

The query management device(s) 102 may execute a query management module 118 that is configured to manage the execution of one or more of the data queries 104. In some implementations, the query management module 118 may include a query execution time prediction module 120. Although the query execution time prediction module 120 is described herein as a sub-module, sub-component, or sub-process of the query management module 118, implementations are not so limited. In some implementations the query execution time prediction module 120 may execute separately from the query management module 118. On receiving an indication that a data query 104(1) is to be executed on one or more data storage systems 124, such as in cases where the data query 104(1) is scheduled to execute at a particular date and time, the query management module 118 may instruct the query cost calculation module 106 to calculate a cost of the data query 104(1). The calculated cost may be included in query cost data 108(1) that is provided to the query execution time prediction module 120. The query execution time prediction module 120 may access the model 116 associated with the particular data storage system(s) 124 on which the data query 104(1) is to be executed. Based on the model 116 and the query cost data 108(1), the query execution time prediction module 120 may determine a predicted query execution time 122 for the data query 104(1). In some implementations the predicted query execution time 122 may be normalized such that values modeled on different data storage systems 124 are comparable.

In some implementations, the query management module 118 may execute the data query 104(1) on the data storage system(s) 124, and receive query results 126 resulting from the execution of the data query 104(1). The query results 126 may be stored or provided to one or more users, processes, or devices for further processing. In some implementations, the execution of the data query 104(1) may be managed based on the predicted query execution time 122. For example, the execution of the data query 104(1) may be monitored and terminated if its execution time is substantially longer than the predicted query execution time 122. Alternatively, the execution of the data query 104(1) may be terminated if it executes longer than a time period that is the sum of the predicted query execution time 122 and a multiplicative factor times a variance that characterizes a distribution of the data modeled by the model 116 as described above. The use of the predicted query execution time 122 to manage the execution of the data query 104(1) is described further with reference to FIGS. 9 and 10.

In some implementations, the execution time of the data query 104(1) may be measured and incorporated into the query execution time data 110. In such cases, the predicted query execution time 122 for the data query 104(1) may be further based on the measured execution times of recent execution instances of the data query 104(1). In this way, implementations may employ recently collected query execution time data 110 in addition to the model 116 to determine the predicted query execution time 122 for the data query 104(1).

In some implementations, a job scheduling module may use the predicted query execution time 122 to schedule or coordinate execution of data queries 104. The job scheduling module may generate job scheduling data which orders the data queries 104 for execution in such a fashion as to optimize one or more factors. These factors may include minimizing overall run time, maximizing resource utilization, and so forth. Some implementations of the job scheduling module are described in U.S. Non-Provisional patent application Ser. No. 13/926,752 titled "Scheduling Data Access Jobs" and filed on 25 Jun. 2013.

The data storage system(s) 124 may include any number of datastores, databases, or other types of data storage systems that support any type of data storage format. In some cases, the data storage system(s) 124 may employ a relational data storage format including one or more formally described tables, each table including one or more columns associated with data attributes. In such cases, the data storage system(s) 124 may be managed through any type of relational database management system (RDBMS) software. The data storage system(s) 124 may include any number of relational databases, including but not limited to databases managed through any of the following: Oracle™ Database and MySQL™, from Oracle™ Corporation of Redwood City, Calif., USA; DB2™ from International Business Machines™ (IBM) Corporation of Armonk, N.Y., USA; Linter™, from the RELEX Group of Voronezh, Russia; Microsoft Access™ and Microsoft SQL Server™, from Microsoft™ Corporation of Redmond, Wash., USA; PostgreSQL™, from the PostgreSQL Global Development Group; or SQLite™, from D. Richard Hipp.

The data storage system(s) 124 may also include any number of non-relational datastores that employ a non-relational data storage. Such non-relational datastores may employ a hierarchical database model, or a network database model. The non-relational datastores may also include key-value datastores, hash tables, flat files, associative arrays, other types of data structures, or unstructured data storage. In some cases, the non-relational datastores may store metadata describing data attributes or other aspects of the stored data. The data storage system(s) 124 may include any number of non-relational datastores, including but not limited to datastores managed through any of the following: FoxPro™ database management system, from Microsoft™ Corporation of Redmond, Wash., USA; ParAccel™ Analytic Database, from ParAccel™ Incorporated of San Diego, Calif., USA; Berkeley DB from Oracle™ Corporation of Redwood City, Calif., USA; MongoDB™ from MongoDB, Inc. of New York, N.Y., USA; or Cassandra™, CouchDB™, and Hadoop™, from the Apache Software Foundation.

Although the data storage system(s) 124 are depicted as external to the query management device(s) 102, in some implementations the data storage system(s) 124 may be at least partly incorporated into the query management device(s) 102. Further, although FIG. 1 depicts the model generation module 112, the query cost calculation module 106, and the query management module 118 as executing on the same set of one or more query management device(s) 102, in some implementations one or more of the model generation module 112, the query cost calculation module 106, or the query management module 118 may execute on one or more other devices that are able to communicate with the query management device(s) 102 over one or more networks. In some cases, the query cost calculation module 106 may execute on the data storage system(s) 124. For example, if the data storage system(s) 124 are managed using the Oracle™ database, the query cost data 108 may be determined in response to an "EXPLAIN PLAN" command entered at a command line interface of the data storage system(s) 124.

Data such as the data queries 104, the query cost data 108, the query execution time data 110, the models 116, the query results 126, and so forth may be stored in data storage, such as described below with regard to FIG. 5.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol such as any version of the Secure Sockets Layer (SSL) or the Transport Layer Security (TLS) protocol.

Figure 2:
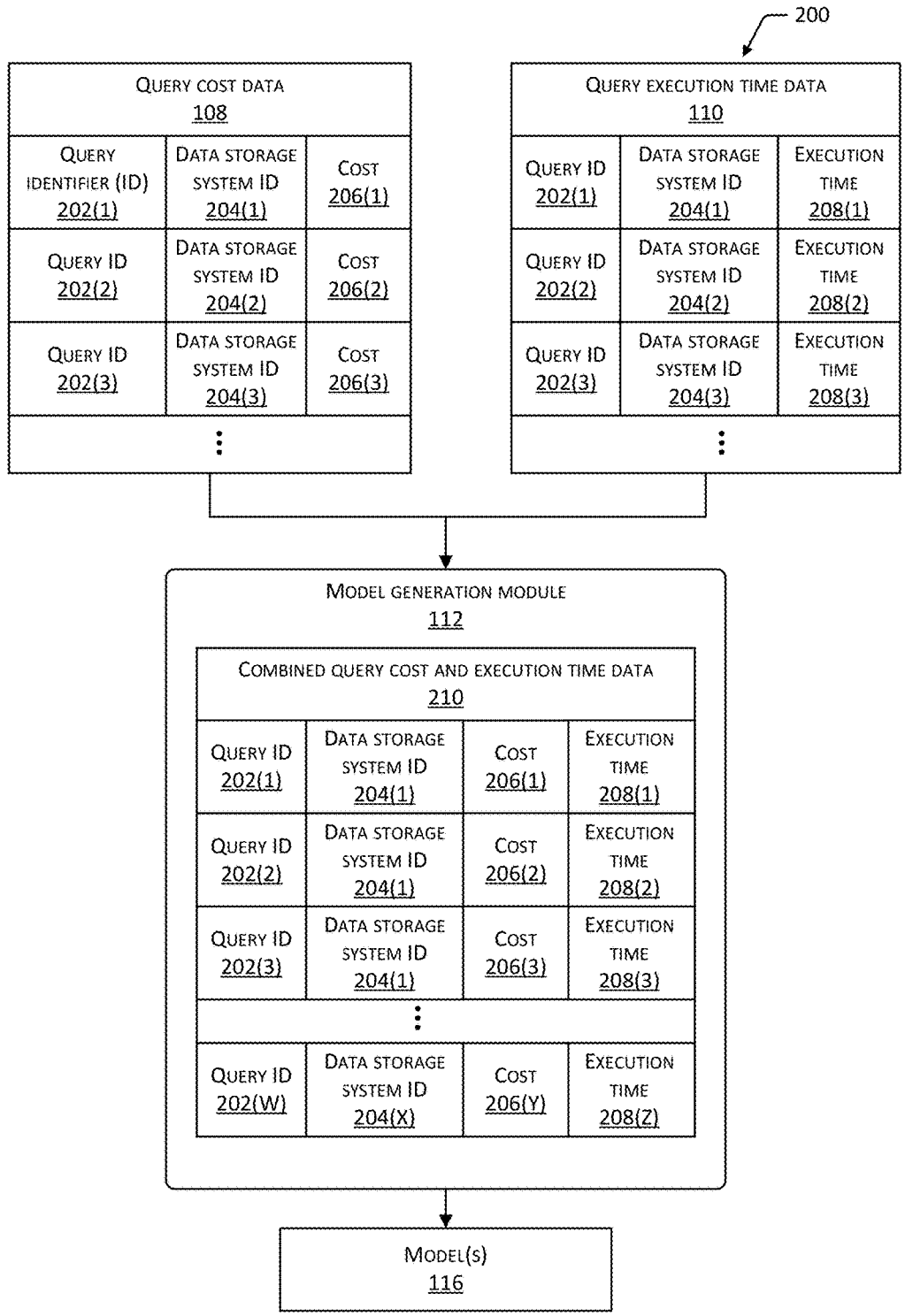
FIG. 2 depicts a schematic illustrating an example of query cost data and query execution time data that may be employed to generate the model.

FIG. 2 depicts a schematic 200 illustrating an example of the query cost data 108 and the query execution time data 110 that may be correlated to generate the model 116. In some implementations, the query cost data 108 may be arranged as a table that includes any number of records (e.g., rows). Each record may correspond to a particular data query 104, and may include a query identifier (ID) 202, a data storage system ID 204, and a cost 206. The query ID 202 may identify the data query 104 associated with the row, based on a name, identification number, or some other identifier. In some cases, the query ID 202 may include a full or partial listing of the data query 104 itself, e.g., expressed using a query language. The data storage system ID 204 may identify the data storage system(s) 124 for which the cost 206 was determined. For example, in cases where the cost 206 is determined through execution of an "EXPLAIN PLAN" command entered at a command line interface of the data storage system(s) 124, the data storage system ID 204 may identify the particular Oracle™ database cluster(s) where the "EXPLAIN PLAN" command was executed. In other implementations the data storage system ID 204 may identify other groupings of data storage systems 124. The data storage system ID 204 may identify the data storage system(s) 124 using a hostname, an Internet Protocol (IP) address, a description, cluster name, or another type of identifier. The cost 206 may be a measure of the processing resources predicted to be consumed during execution of the data query 104, as described above.

In some implementations, the query execution time data 110 may also be arranged as a table that includes any number of records (e.g., rows), where each record corresponds to a particular execution instance of a data query 104. Each record may include the query ID 202 and the data storage system ID 204 identifying the data storage system(s) 124 where the execution time 208 was measured for the data query 104. The execution time 208 may be expressed using any unit of time measurement, such as milliseconds. In some implementations, the model generation module 112 may combine the records of the query cost data 108 and the query execution time data 110 for particular execution instances of the data queries 104, to generate combined query cost and execution time data 210. The combined query cost and execution time data 210 may be arranged as a table that includes any number of records (e.g., rows), where each record corresponds to a particular execution instance of a data query 104. Each record may include the query ID 202, the data storage system ID 204, the cost 206, and the execution time 208. Accordingly, each record of the combined query cost and execution time data 210 may comprise a tuple (e.g., a vector or ordered pair) of cost 206 and execution time 208.

As described herein, the model generation module 112 may use the combined query cost and execution time data 210 to generate one or more models 116. The models 116 may be generated for particular query IDs 202, data storage system IDs 204, or both. For example, the model 116 may be based on the execution times 208 for data queries 104 executing on a particular data storage system ID 204.

In some implementations the combined query cost and execution time data 210, the models 116, or both, may be normalized. For example, due to differences in physical hardware between data storage system ID 204(1) and 204 (2), job loading, and so forth, executing the same data query 104 may have different query cost data 108 and predicted query execution time 122. By normalizing or standardizing, models 116 may be extended for applicability across other data storage systems 124.

Figure 3:
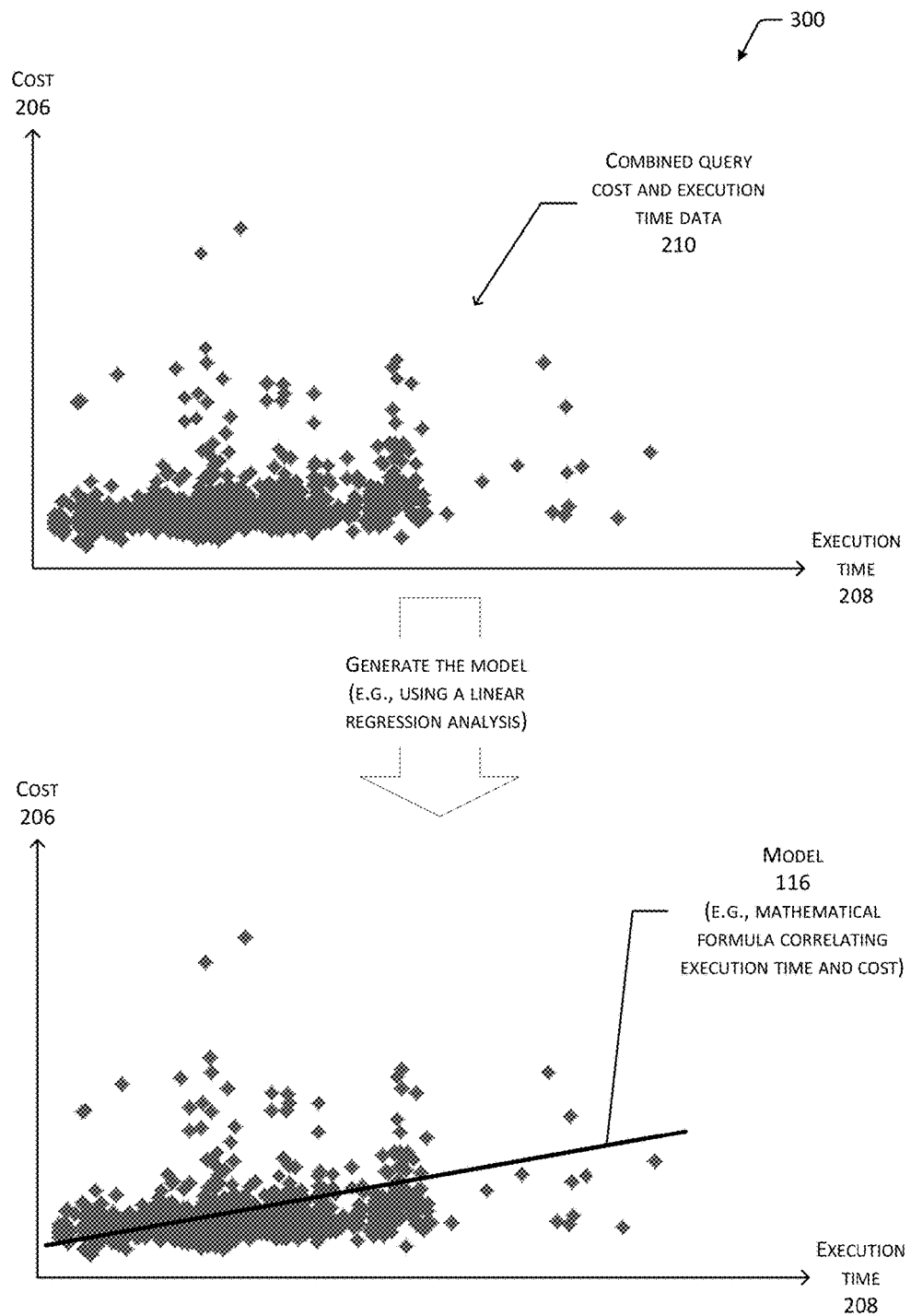
FIG. 3 depicts a schematic of an example of combined query cost and execution time data, and an example of a model correlating query execution time and query cost.

FIG. 3 depicts a schematic 300 of an example of the combined query cost and execution time data 210, and an example of the model 116 correlating the query execution time data 110 and the query cost data 108. In the example FIG. 3, the combined query cost and execution time data 210 is presented as a scatter plot with execution time 208 along the vertical axis and cost 206 along the horizontal axis. Each data point in the scatter plot may be associated with a record in the combined query cost and execution time data 210, e.g., a tuple or an ordered pair of execution time 208 and cost 206.

As shown in FIG. 3, the model 116 may be generated by fitting a curve to the combined query cost and execution time data 210. The mathematical formula describing the curve may be employed as the model 116. For example, the model 116 may be expressed as a mathematical formula $T_e = f(C)$, where $T_e$ is the predicted query execution time 122 of a data query 104 and C is the cost 206 of the data query 104. In implementations where the regression analysis is a linear regression analysis, f (C) may be expressed as a linear combination of parameters based on the cost C. For example, the model may be expressed as $T_e = 6e^{-5C} + 50$, where $T_e$ is the estimated execution time of a data query and C is the cost of the data query. The coefficients 6, −5, and 50 in this example may be determined to generate a curve that substantially fits the combined query cost and execution time data 210 depicted in the scatter plot. In some cases, the coefficients may be determined through the regression analysis to determine the best fitting curve for the combined query cost and execution time data 210. In some implementations, the model generation module 112 may determine the model 116 that describes a predetermined threshold proportion (e.g., 80% or 90%) of the combined query cost and execution time data 210.

Figure 4:
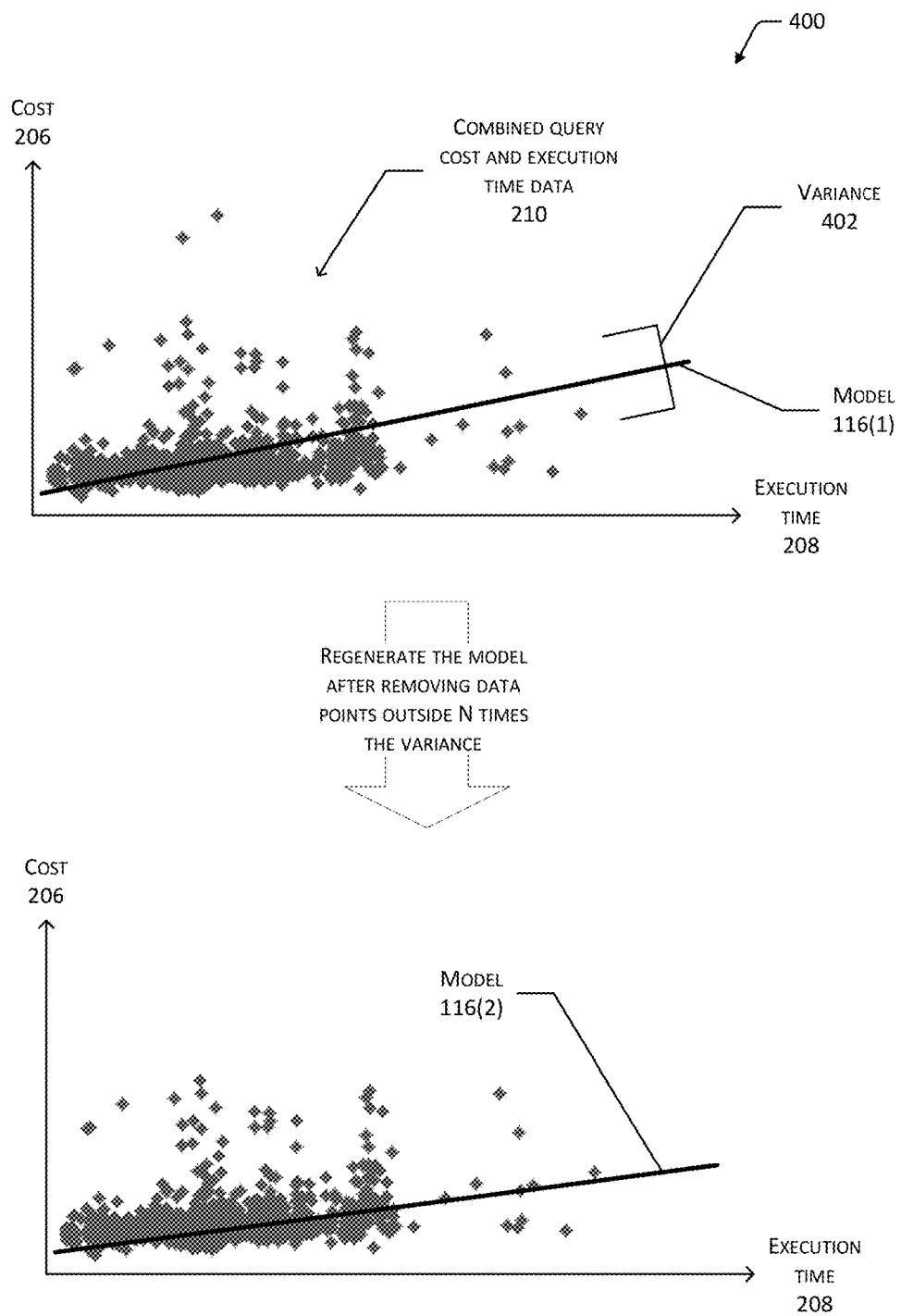
FIG. 4 depicts a schematic of an example of combined query cost and execution time data, and an example of a model that is determined following the removal of one or more outlying data points from the combined query cost and execution time data.

FIG. 4 depicts a schematic 400 of an example of the combined query cost and execution time data 210, and an example model 116 generated following the removal of one or more outlying data points from the combined query cost and execution time data 210. In implementations illustrated in FIG. 4, a preliminary model 116(1) is determined that best describes the combined query cost and execution time data 210 as described above. The model 116(1) may include a variance 402 that characterizes a distribution (e.g., a spread) of the combined query cost and execution time data 210 with respect to the model 116(1). One or more outlying data points may be removed from the combined query cost and execution time data 210. In some cases, the outlying data point(s) may be removed based on a manual examination of the combined query cost and execution time data 210. Alternatively, the outlying data point(s) may be identified as those data points that are farther from the model 116(1) than a predetermined multiplicative factor (e.g., N) times the variance 402.

After removal of the outlying data point(s), the remaining subset of the combined query cost and execution time data 210 may be analyzed to determine a second model 116, and that model 116 may be employed to subsequently predict execution times for data queries 104 to be executed. The outlying data point(s) may represent execution instances of the data queries 104 that are sufficiently anomalous or rare, such that their omission from the model generation analysis may improve the predictive value of the model 116. In some cases, the variance 402 may be calculated for the model 116(2) and stored with the model 116(2). The variance 402 may then be employed to determine a time period during which a data query 104 may execute. For example, the time period in which the data query 104 executes may be a sum of the predicted query execution time 122 and a multiplicative factor times the variance 402.

Figure 5:
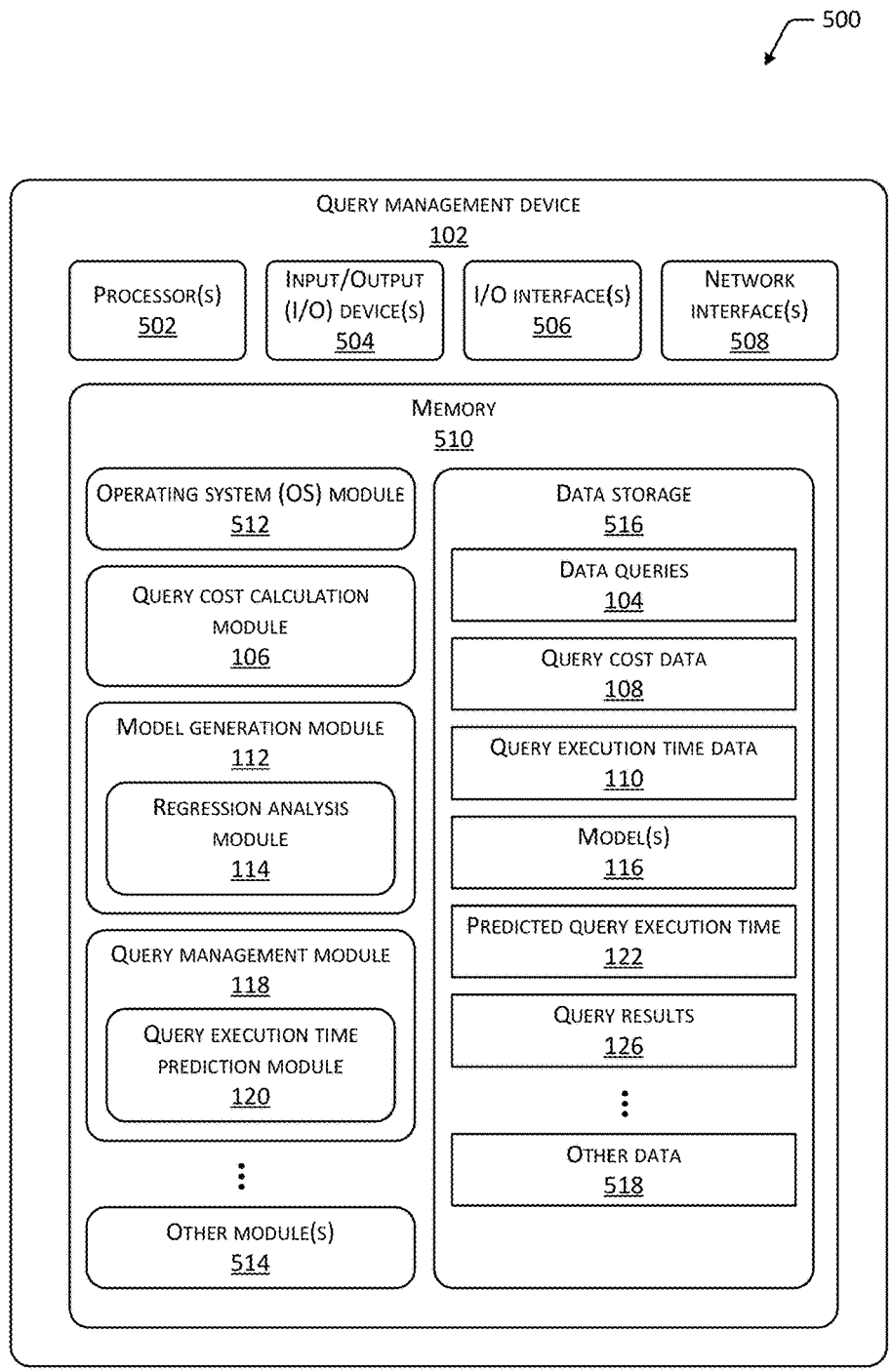
FIG. 5 depicts a block diagram of an example query management device configured to generate the model and employ the model to manage data query execution.

FIG. 5 depicts a block diagram 500 of an example of the query management device(s) 102. As shown in the block diagram 500, the query management device 102 may include one or more processors 502 (e.g., hardware-based processor(s)) configured to execute one or more stored instructions. The processor(s) 502 may comprise one or more cores.

The query management device 102 may include one or more input/output (I/O) devices 504. The I/O device(s) 504 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 504 may also include output devices such as a display, an audio output device (e.g., a speaker), a printer, a haptic output device, and so forth. The I/O device(s) 504 may be physically incorporated with the query management device 102, or may be externally placed.

The query management device 102 may include one or more I/O interfaces 506 to enable components or modules of the query management device 102 to control, interface with, or otherwise communicate with the I/O device(s) 504. The I/O interface(s) 506 may enable information to be transferred in or out of the query management device 102, or between components of the query management device 102, through serial communication, parallel communication, or other types of communication. For example, the I/O interface(s) 506 may comply with a version of the RS-232 standard for serial ports, or with a version of the Institute of Electrical and Electronics Engineers (IEEE) 1284 standard for parallel ports. As another example, the I/O interface(s) 506 may be configured to provide a connection over Universal Serial Bus (USB) or Ethernet. In some cases, the I/O interface(s) 506 may be configured to provide a serial connection that is compliant with a version of the IEEE 1394 standard. The query management device 102 may also include one or more busses or other internal communications hardware or software that allow for the transfer of data between the various modules and components of the query management device 102.

The query management device 102 may include one or more network interfaces 508 that enable communications between the query management device 102 and other network accessible computing devices, such as the data storage system(s) 124. The network interface(s) 508 may include one or more network interface controllers (NICs) or other types of transceiver devices configured to send and receive communications over a network.

The query management device 102 may include one or more memories, described herein as memory 510. The memory 510 comprises one or more computer-readable storage media (CRSM). The CRSM may include one or more of an electronic storage medium, a magnetic storage medium, an optical storage medium, a quantum storage medium, a mechanical computer storage medium, and so forth. The memory 510 provides storage of computer-readable instructions that may describe data structures, program modules, processes, applications, or other data for the operation of the query management device 102. In some implementations, the memory 510 may provide storage of computer-readable instructions or other information in a non-transitory format.

The memory 510 may include an operating system (OS) module 512. The OS module 512 may be configured to manage hardware resources such as the I/O device(s) 504, the I/O interface(s) 506, and the network interface(s) 508, and to provide various services to applications, processes, or modules executing on the processor(s) 502. The OS module 512 may include one or more of the following: any version of the Linux™ operating system; any version of iOS™ from Apple™ Corp. of Cupertino, Calif., USA; any version of Windows' or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion™ Ltd. of Waterloo, Ontario, Canada; any version of VxWorks™ from Wind River Systems™ of Alameda, Calif., USA; or other operating systems.

The memory 510 may include one or more of the modules described above as executing on the query management device 102, such as one or more of the query cost calculation module 106, the model generation module 112, the regression analysis module 114, the query management module 118, or the query execution time prediction module 120. The memory 510 may also include one or more other modules 514, such as a user authentication module or an access control module to secure access to the query management device 102, and so forth.

The memory 510 may include data storage 516 to store data for operations of the query management device 102. The data storage 516 may comprise a database, array, structured list, tree, or other data structure, and may be a relational or a non-relational datastore. The data storage 516 may store data such as that described above, including one or more of the data queries 104, the query cost data 108, the query execution time data 110, the model(s) 116, the predicted query execution time 122, or the query result(s) 126. The data storage 516 may also store other data 518, such as user authentication information or access control data. In some implementations, at least a portion of the information stored in the data storage 516 may be stored externally to the query management device 102, on other devices that may communicate with the query management device 102 via the I/O interface(s) 506 or via the network interface(s) 508.

Figure 6:
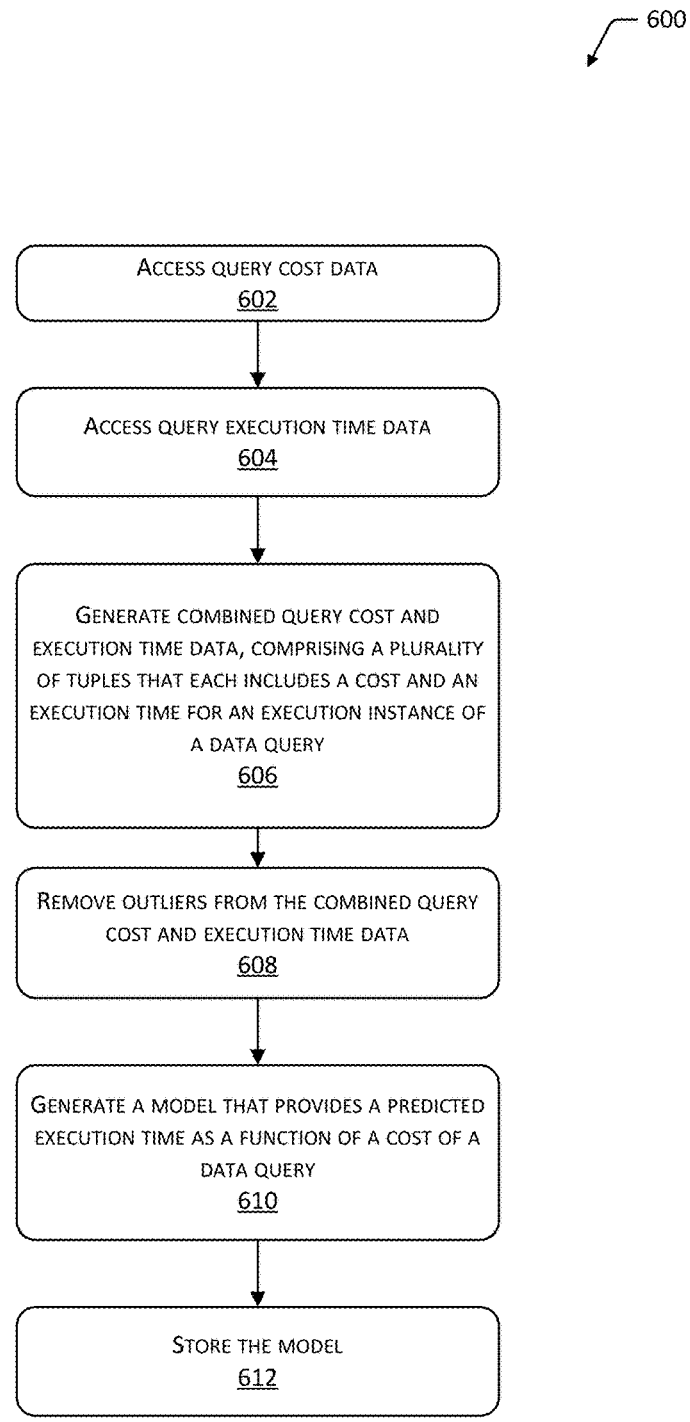
FIG. 6 depicts a flow diagram of a process for generating a model based on correlating query execution time and query cost for a plurality of execution instances of one or more of data queries.

FIG. 6 depicts a flow diagram 600 of a process for generating the model 116 based on correlating the query execution time data 110 and query cost data 108 for a plurality of execution instances of one or more of data queries 104. In some implementations the model 116 may be generated for a set of data storage systems 124, such as a particular server cluster. In other implementations, the query execution time data 110, query cost data 108, or both may be normalized and used to allow for generation of models 116 applicable across different data storage systems 124. One or more operations of the process may be performed by the model generation module 112, the regression analysis module 114, other modules executing on the query management device(s) 102, or modules executing on other devices.

At 602, the query cost data 108 is accessed, the query cost data 108 describing the cost of executing each of a plurality of data queries 104 on the data storage system(s) 124. As described above, the cost of a data query 104 may indicate a consumption of processing resources during execution of the data query 104.

At 604, the query execution time data 110 is accessed, the query execution time data 110 describing one or more previous execution times 208 for one or more of the data queries 104.

At 606, in some implementations the query cost data 108 and the query execution time data 110 may be combined to generate the combined query cost and execution time data 210. As described with reference to FIG. 2, the combined query cost and execution time data 210 may include a plurality of tuples (e.g., ordered pairs) that each includes a cost 206 and an execution time 208 for an execution instance of a data query 104.

At 608, in some implementations one or more outlying data points may be removed from the combined query cost and execution time data 210, and the remaining subset of the combined query cost and execution time data 210 may be employed in subsequent processing to generate the model 116.

At 610, the model 116 may be generated based on a statistical analysis of the combined query cost and execution time data 210. The model 116 may provide a predicted query execution time 122 as a function of the cost 206 for a data query 104, based on a correlation of the previous execution times 208 and the costs 206 of a plurality of data queries 104. As described above, the model 116 may be determined based on a regression analysis of the combined query cost and execution time data 210, such as a linear regression analysis.

At 612, the model 116 is stored in memory on the query management device(s) 102 or elsewhere, such that the model 116 is available for determining a predicted query execution time 122 of a data query 104 based on its cost 206. The model 116 may be used by a job scheduling module to determine the predicted query execution time 122 of the data query 104, and generate job scheduling data accordingly. For example, the predicted query execution time 122 may be used to determine a start time of execution of the data query 104 such that the query results 126 are available at a particular time.

In another implementation, the job scheduling module may generate the job schedule data using query cost data 108 which has been normalized. For example, the data queries 104 may be scheduled based on normalized query cost data 108.

Figure 7:
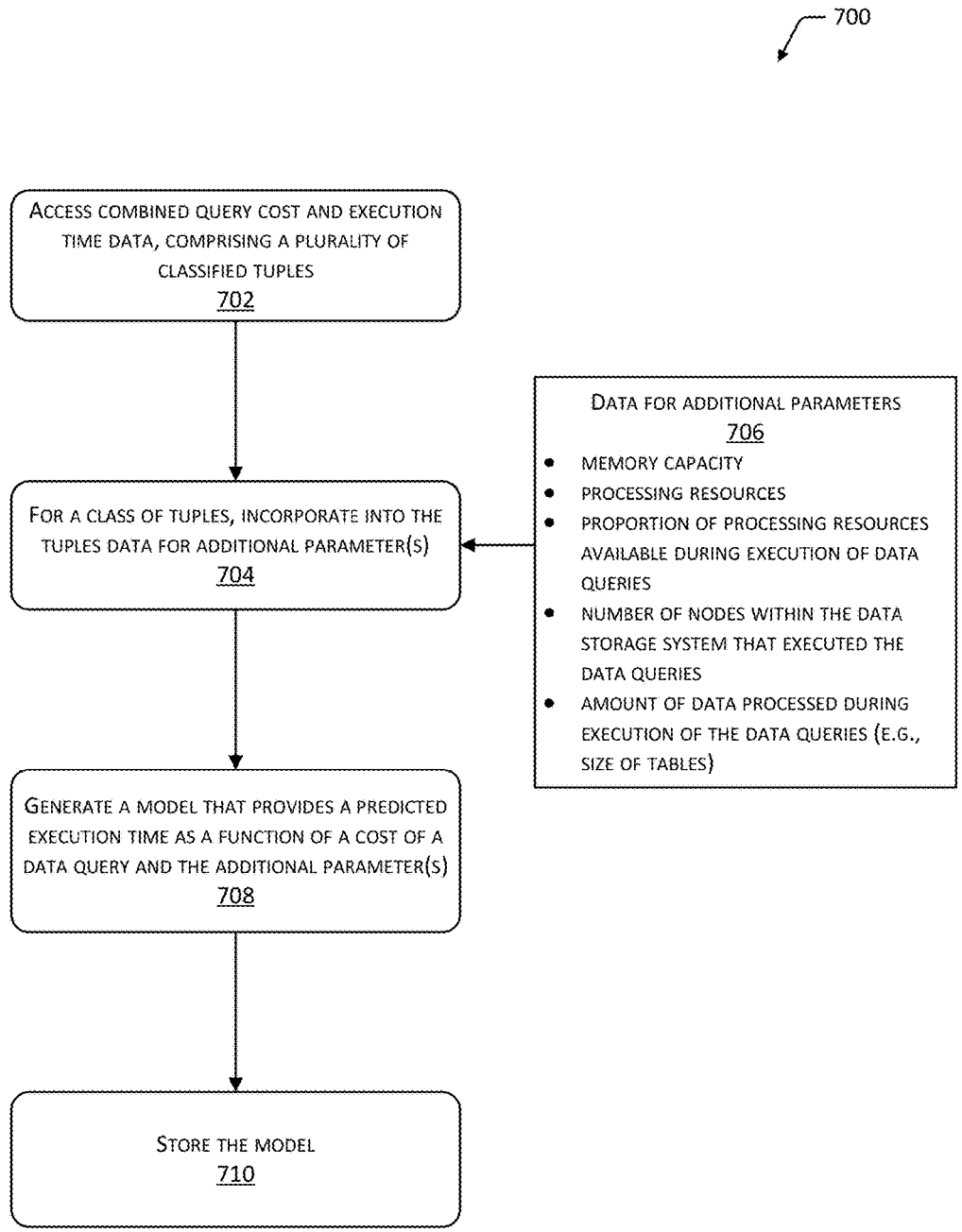
FIG. 7 depicts a flow diagram of a process for generating a model based on correlating query execution time, query cost, and data for additional parameters describing characteristics of one or more data storage systems where the one or more data queries executed.

FIG. 7 depicts a flow diagram 700 of a process for generating the model 116 based on correlating the query execution time data 110, the query cost data 108, and data for additional parameters describing characteristics of one or more data storage systems 124 where the one or more data queries 104 executed. One or more operations of the process may be performed by the model generation module 112, the regression analysis module 114, other modules executing on the query management device(s) 102, or modules executing on other devices.

At 702, the combined query cost and execution time data 210 is accessed. In some implementations, the combined query cost and execution time data 210 may be segregated into classifications. These classifications may be indicative of particular resource reliance by the data queries 104 in the classification. For example, one classification may comprise data queries 104 which are I/O intensive, calling for I/O operations above a specified threshold. By classifying the data queries 104 and performing the following analysis on a given classification, accuracy of the model 116 may be improved. Likewise, by classifying the data queries 104 and omitting the tuples which are not part of the classification, noise in the set of data which is analyzed by the regression analysis module 114 may be reduced.

At 704, additional data may be incorporated into at least a portion of the classified tuples of the combined query cost and execution time data 210. In some implementations, the additional data may include data for additional parameter(s) 706 describing one or more characteristics of the data storage system(s) 124 where the data queries 104 previously executed. The data for additional parameters 706 may include, but are not limited to: memory capacity (e.g., the storage or the active runtime memory capacity) of the data storage system(s) 124; processing resources (e.g., the total CPU) of the data storage system(s) 124; a proportion of the processing resources available during the execution of the data queries 104 (e.g., the available CPU); the number of data storage system(s) 124 that executed the data queries 104, such as the number of nodes in a cluster of data storage system(s) 124; or the amount of data processed during the execution of the data queries 104, such as the size of or the amount of data stored in the tables accessed by the data queries 104.

At 708, the model 116 may be generated based on the combined query cost and execution time data 210 as modified to include the data for additional parameters 706. In some implementations, one or more outlying data points may be removed from the combined query cost and execution time data 210 prior to generating the model 116, as described above with reference to 608.

At 710, the model 116 may be stored in memory on the query management device(s) 102 or elsewhere, such that the model 116 is available for determining a predicted query execution time 122 of a data query 104 based on its cost 206 and based on the values of the additional parameter(s). For example, the model 116 may be expressed as a mathematical formula $T_e = f(C, P_1, P_2, P_3, \ldots)$, where $T_e$ is the estimated execution time of a data query 104, C is the cost of the data query 104, $P_1$ is a first additional parameter such as the memory capacity of the data storage system(s) 124 where the data query 104 is to be executed, $P_2$ is a second additional parameter such as the processing resources of the data storage system(s) 124, $P_3$ is a third additional parameter such as the number of nodes in the cluster of data storage system(s) 124 where the data query 104 is to be executed, and so forth. Because the determination of the cost 206 of a data query 104 may not take into account the environment on which the data query 104 executes, incorporating the data for additional parameters 706 when generating the model 116 may provide a model 116 that enables a more accurate prediction of execution times for data queries 104 executing on data storage system(s) 124 of varied characteristics.

Figure 8:
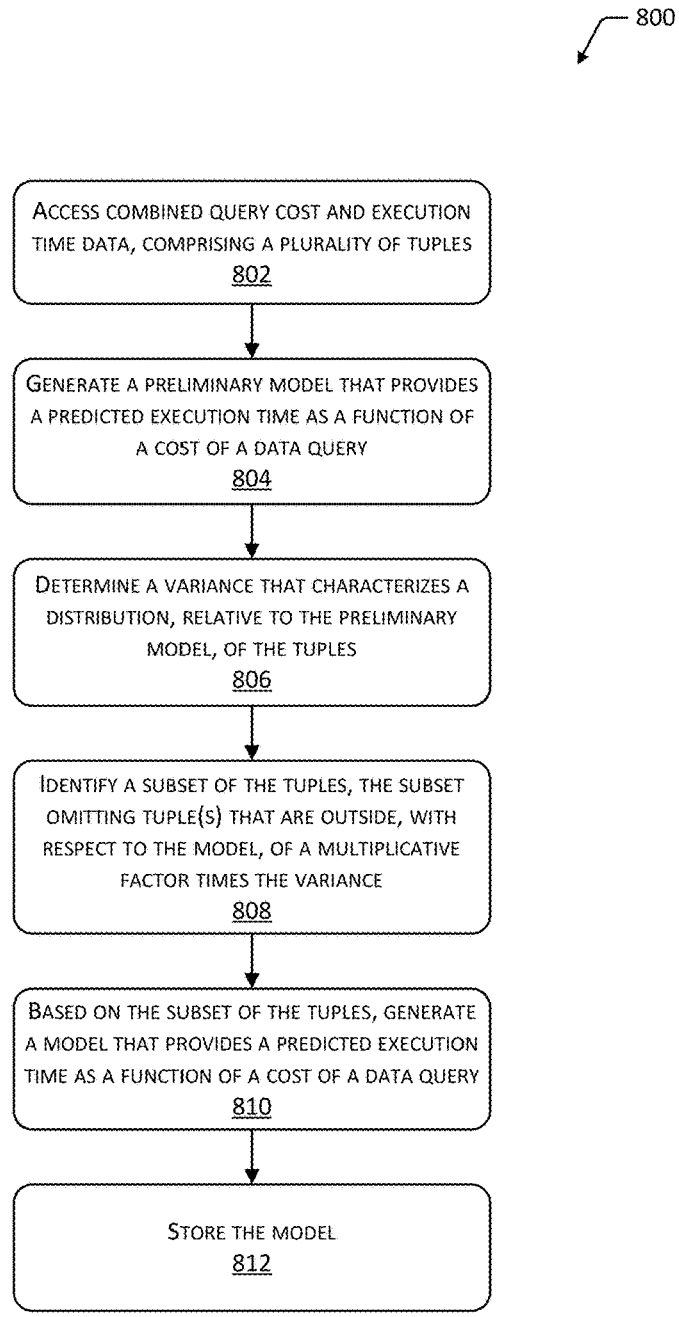
FIG. 8 depicts a flow diagram of a process for generating a model based on correlating query execution time and query cost based on a set of combined query cost and execution time data from which one or more outlying data points have been removed.

FIG. 8 depicts a flow diagram 800 of a process for generating the model 116 based on correlating the query execution time data 110 and the query cost data 108 based on a subset of the combined query cost and execution time data 210 from which one or more outlying data points have been removed. One or more operations of the process may be performed by the model generation module 112, the regression analysis module 114, other modules executing on the query management device(s) 102, or modules executing on other devices. The model 116 as described may be for the query execution time data 110 and query cost data 108 of a particular grouping of data storage systems 124. In other implementations, the query execution time data 110 and the query cost data 108, or the combined query cost and execution time data 210 may be normalized. Once normalized, the model 116 may be used to generate predicted query execution time 122 across different data storage systems 124, such as on differing server clusters.

At 802, the combined query cost and execution time data 210 is accessed. At 804, the preliminary model 116(1) may be generated based on the combined query cost and execution time data 210 as described above. The preliminary model 116(1) may be generated based on a statistical analysis, such as a linear or non-linear regression analysis.

At 806, the variance 402 may be determined. As described above with reference to FIG. 4, the variance 402 may characterize the distribution with respect to the model 116(1) of the data points included in the combined query cost and execution time data 210, e.g., the spread of the data relative to the model 116(1).

At 808, one or more outlying data points may be removed from the combined query cost and execution time data 210, to identify a subset of the combined query cost and execution time data 210 to be used in subsequent analysis. As described above, the outlying data point(s) may be those data point(s) that are outside a multiplicative factor times the variance 402 relative to the curve of the model 116(1).

At 810, based on the remaining subset of the combined query cost and execution time data 210, the model 116(2) may be generated using a regression analysis such as a linear regression analysis. At 812, the model 116(2) may be stored and made available for subsequent use in predicting the execution time of one or more data queries 104.

Figure 9:
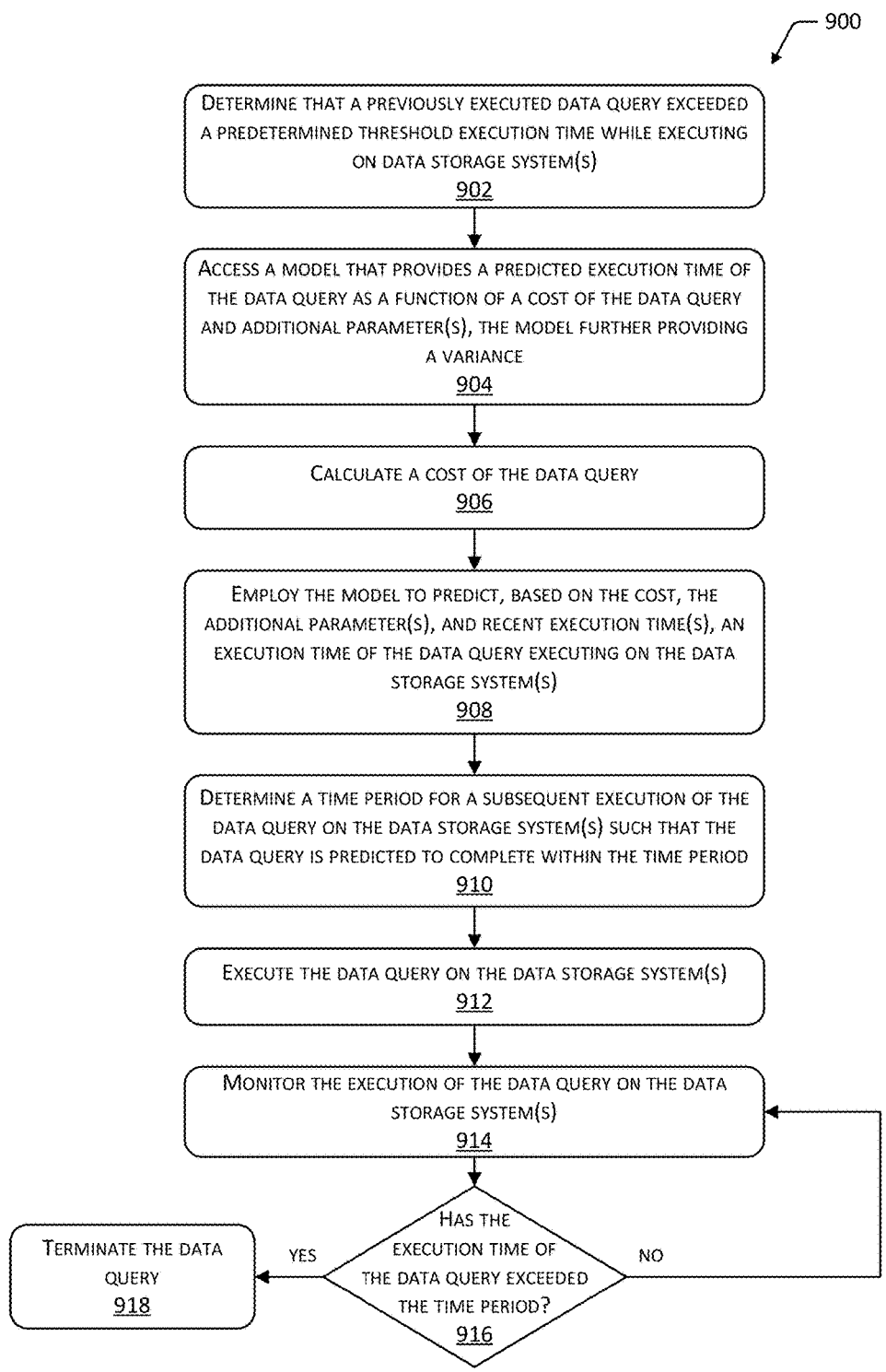
FIG. 9 depicts a flow diagram of a process for employing the model to predict the execution time of a data query, and terminating the data query if it executes longer than the predicted execution time.

FIG. 9 depicts a flow diagram 900 of a process for employing the model 116 to determine the predicted query execution time 122 of a data query 104, and managing the execution of the data query 104 based on the predicted query execution time 122. One or more operations of the process may be performed by the query management module 118, the query execution time prediction module 120, other modules executing on the query management device(s) 102, or modules executing on other devices.

At 902, a determination is made that a previously executed data query 104 exceeded a predetermined threshold execution time while executing on one or more data storage systems 124. In some cases, a data query 104 may have been automatically terminated if it executed longer than the predetermined threshold execution time (e.g., 120 minutes). To enable the management of the data query 104 during a subsequent execution, the model 116 may be employed to determine the predicted query execution time 122 of the data query 104.

At 904, the model 116 is accessed. As described above, the model 116 may provide a predicted query execution time 122 as a function of the cost 206 of the data query 104. In some implementations, the model 116 may provide the predicted query execution time 122 as a function of one or more parameters describing characteristics of the data storage system(s) 124 where the data query 104 is to be executed. The one or more parameters may include the query cost data 108, memory capacity used by the one or more data storage systems 124; processing resources used by the one or more data storage systems 124; a proportion of the processing resources available during the execution of the plurality of data queries 104; a number of nodes that executed the plurality of data queries 104; an amount of data processed during the execution of the plurality of data queries 104, and so forth.

In some implementations, the model 116 may include, or may be stored with, the variance 402. In such cases, the variance 402 may also be retrieved or otherwise accessed at 904.

In implementations where the cost 206 is used as one of the one or more parameters, at 906, the cost 206 of the data query 104 may be calculated or otherwise determined. For example, the cost 206 may be determined by execution of the "EXPLAIN PLAN" command in the Oracle™ database cluster.

At 908, the model 116 may be employed to determine the predicted query execution time 122 based on the one or more parameters, such as the cost 206 of the data query 104. As described above, in some implementations the additional parameter(s) describing characteristics of the data storage system(s) 124 may also be provided as input to the model 116, such that the execution time is predicted thereon. Further, in some implementations the predicted query execution time 122 may also be based on recently collected execution times for the data query 104. For example, the average of the execution times of the execution instances of the data query 104 in the last day, last week, last month, and so forth may be employed to refine or otherwise modify the predicted query execution time 122 provided by the model 116.

At 910, a time period may be determined for the subsequent execution of the data query 104 on the data storage system(s) 124, such that the data query 104 is predicted to complete within the time period. In some implementations, the time period may be the predicted query execution time 122 output by the model 116. Alternatively, the time period may be a sum of the predicted query execution time 122 and a multiplicative factor times the variance 402.

At 912, the data query 104 may be executed on the data storage system(s) 124. At 914, the execution of the data query 104 may be monitored, e.g., to determine how long it has been executing. At 916, a determination may be made whether the data query 104 has executed longer than the time period determined at 910. If so, the process may proceed to 918 and terminate the execution of the data query 104. If not, the process may return to 914 and continue monitoring the execution of the data query 104.

In some implementations, execution time of the data query 104 in less than the time period determined at 910 may result in other actions by the system. For example, the job scheduling module may use information indicative of early completion to perform another data query 104. In another example, an alert or report may be stored which may be used by a system administrator or automated tool to look for errors in the data query 104, or other problems.

Figure 10:
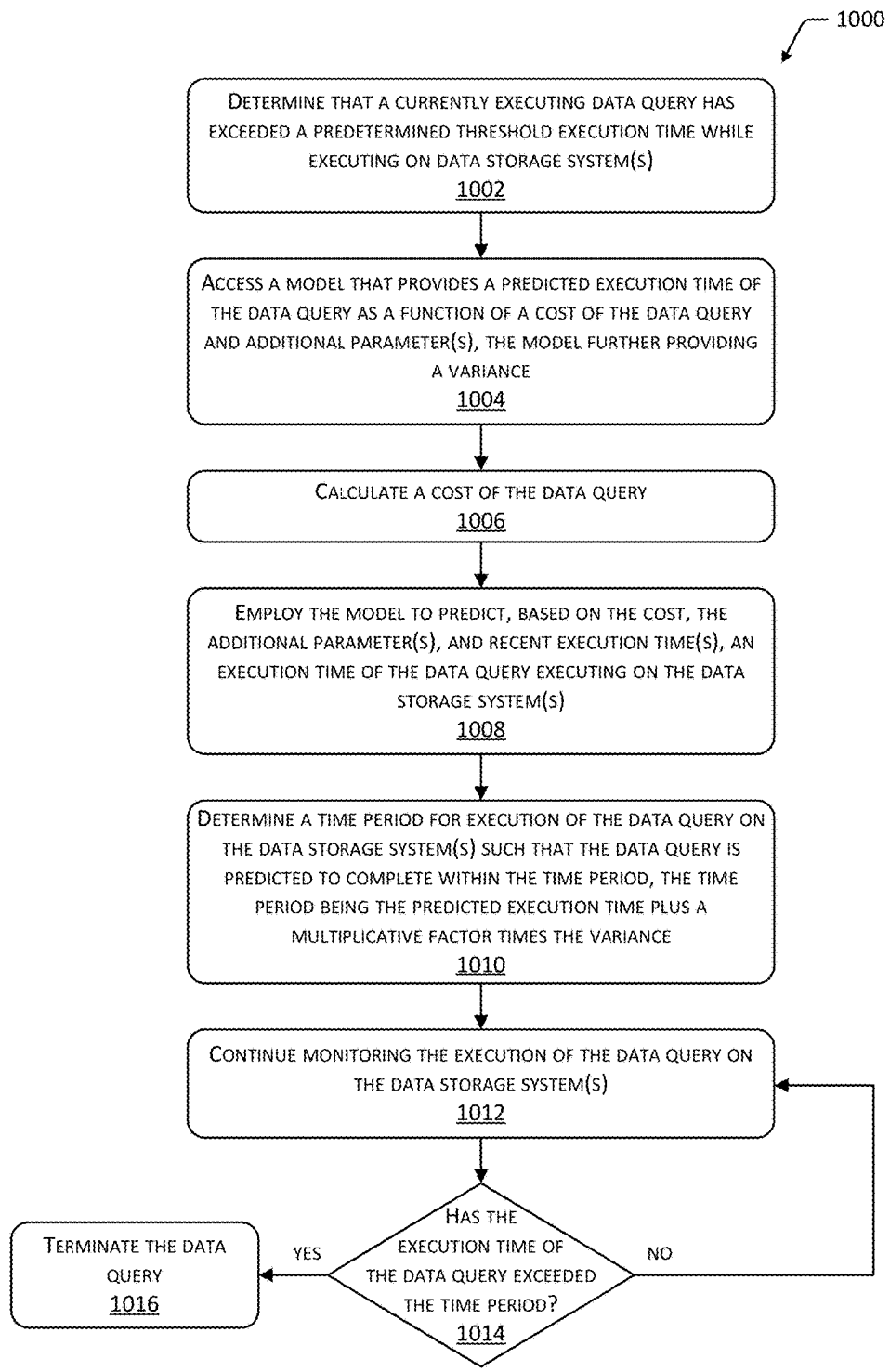
FIG. 10 depicts a flow diagram of a process for employing the model to predict the execution time of a currently executing data query, and terminating the data query if it executes longer than the predicted execution time.

FIG. 10 depicts a flow diagram 1000 of a process for employing the model 116 to determine the predicted query execution time 122 of a currently executing data query 104, and managing the execution of the data query 104 based on the predicted query execution time 122. One or more operations of the process may be performed by the query management module 118, the query execution time prediction module 120, other modules executing on the query management device(s) 102, or modules executing on other devices.

At 1002, a determination is made that a currently executing data query 104 has exceeded a predetermined threshold execution time (e.g., 60 minutes) while executing on one or more data storage systems 124. At 1004, the model 116 may be accessed as described with reference to 904. At 1006, the cost 206 of the data query 104 may be calculated or otherwise determined. At 1008, the model 116 may be employed to determine the predicted query execution time 122 for the data query 104. As described above, in some implementations the predicted query execution time 122 may be further based on additional parameter(s) for characteristics of the data storage system(s) 124. The predicted query execution time 122 may also be based on recent execution time(s) of the data query 104.

At 1010, a time period for execution of the data query 104 may be determined, as described above with reference to 910. At 1012, the execution of the data query 104 may be monitored to measure how long the data query 104 has been executing. At 1014, a determination is made whether the execution time of the data query 104 has exceeded the time period determined at 1010. If so, the process may proceed to 1016 and terminate the execution of the data query 104. If not, the process may return to 1012 and continue monitoring the execution of the data query 104.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
accessing cost data describing costs of executing a plurality of data queries on one or more data storage systems, the costs indicating consumption of processing resources during execution of the plurality of data queries;
accessing execution time data describing previous execution times of the plurality of data queries;
generating a preliminary model based on a linear regression analysis that correlates the costs and the previous execution times of the plurality of data queries;
determining a variance that characterizes a distribution, relative to the preliminary model, of pairs of the cost data and the execution time data associated with individual executions of the plurality of data queries;

identifying a subset of the pairs of the cost data and the execution time data, the subset omitting one or more of the pairs of the cost data and the execution time data that are outside a multiplicative factor times the variance;

generating a model based on the linear regression analysis that provides a first predicted execution time as a function of a cost of a data query;

executing the data query on the one or more data storage systems;

determining that the data query exceeds a threshold execution time while executing on the one or more data storage systems;

based on the determination, employing the model to calculate a second predicted execution time of the data query based on the cost of the data query; and based at least partly on the second predicted execution time, determining a time period for executing the data query on the one or more data storage systems such that the data query is predicted to complete within the time period, wherein the time period includes a sum of the second predicted execution time and a multiplicative factor times the variance that characterizes a distribution of a combined query cost and execution time data, relative to the model.

2. The method of claim 1, further comprising:

executing the data query on the one or more data storage systems; and terminating the data query based on a determination that the executing of the data query exceeds the time period.

3. The method of claim 1, wherein the calculating of the second predicted execution time of the data query is further based on one or more parameters; and the one or more parameters include one or more of:
memory capacity used by the one or more data storage systems,
processing resources used by the one or more data storage systems,
a proportion of the processing resources available during the execution of the plurality of data queries,
a number of nodes that executed the plurality of data queries, or
an amount of data processed during the execution of the plurality of data queries.

4. A system, comprising:

at least one computing device configured to implement one or more services, wherein the one or more services are configured to:

generate a preliminary model based on a linear regression analysis that correlates costs and previous execution times of a plurality of data queries;

determine a variance that characterizes a distribution, relative to the preliminary model, of pairs of cost data and execution time data associated with individual executions of the plurality of data queries;

identify a subset of the pairs of the cost data and the execution time data, the subset omitting one or more of the pairs of the cost data and the execution time data that are outside a multiplicative factor times the variance;

generate a model based on the regression analysis that provides a first predicted execution time as a function of a cost of data query;

employ the model to calculate a second predicted execution time of the data query based on a cost of the data query; and based at least partly on the second predicted execution time, determine a time period for executing the data query on one or more data storage systems such that the data query is predicted to complete within the time period, and wherein the time period includes a sum of the second predicted execution time and a multiplicative factor times a variance that characterizes a distribution of a combined query cost and execution time data, relative to the model.

5. The system of claim 4, wherein the regression analysis is a linear regression analysis.

6. The system of claim 4, wherein the model is based at least in part on the regression analysis that correlates the costs and the previous execution times of the plurality of data queries on the one or more data storage systems, such that the model is associated with the one or more data storage systems.

7. The system of claim 6, wherein the one or more data storage systems are managed at least partly using a relational database management system (RDBMS).

8. The system of claim 4, wherein:

the one or more services are further configured to access the execution time data describing one or more recent execution times of the data query executing on the one or more data storage systems within a recent period of time; and the second predicted execution time of the data query is further based on the one or more recent execution times of the data query.

9. The system of claim 4, wherein the employing of the model to calculate the second predicted execution time of the data query is based on determining that the data query exceeded a threshold execution time while executing on the one or more data storage systems.

10. The system of claim 4, wherein the one or more services are further configured to:

execute the data query on the one or more data storage systems; and terminate the data query based on a determination that the executing of the data query exceeds the time period.

11. The system of claim 4, wherein the one or more services are further configured to:

access the cost data describing the costs of executing the plurality of data queries on the one or more data storage systems;

access the execution time data describing the previous execution times of the plurality of data queries executing on the one or more data storage systems; and perform the regression analysis to generate the model.

12. The system of claim 4, wherein the variance that characterizes distribution, relative to the model, includes one or more parameters and the previous execution times associated with individual executions of the plurality of data queries.

13. The system of claim 4, wherein the calculating of the second predicted execution time of the data query is further based on one or more parameters; and the one or more parameters include one or more of:
memory capacity used by the one or more data storage systems,
processing resources used by the one or more data storage systems,
a proportion of the processing resources available during the execution of the plurality of data queries, a number of nodes that executed the plurality of data queries, or an amount of data processed during the execution of the plurality of data queries.

14. One or more non-transitory computer-readable media storing instructions which, when executed by at least one processor, instruct the at least one processor to perform actions comprising:

generating a preliminary model based on a linear regression analysis that correlates costs and previous execution times of a plurality of data queries;

determining a variance that characterizes a distribution, relative to the preliminary model, of pairs of cost data and execution time data associated with individual executions of the plurality of data queries;

identifying a subset of the pairs of the cost data and the execution time data, the subset omitting one or more of the pairs of the cost data and the execution time data that are outside a multiplicative factor times the variance;

generating a model based on the regression analysis that provides a first predicted execution time as a function of one or more parameters associated with execution of the data query;

employing the model to calculate a second predicted execution time of the data query based at least partly on the one or more parameters; and based at least partly on the second predicted execution time, determining a time period for executing the data query on one or more data storage systems such that the data query is predicted to complete within the time period, and wherein the time period includes a sum of the second predicted execution time and a multiplicative factor times a variance that characterizes a distribution of a combined query cost and execution time data, relative to the model.

15. The one or more non-transitory computer-readable media of claim 14, wherein:

the model provides the second predicted execution time of the data query as the function of the parameter;

the model is based at least in part on the regression analysis that correlates the parameter, and the previous execution times for the plurality of data queries;

the calculating of the second predicted execution time of the data query is based on the parameter; and the one or more parameters include one or more of:
query cost data;
memory capacity used by the one or more data storage systems;
processing resources used by the one or more data storage systems;
a proportion of the processing resources available during the execution of the plurality of data queries;
a number of nodes that executed the plurality of data queries; or
an amount of data processed during the execution of the plurality of data queries.

16. The one or more non-transitory computer-readable media of claim 14, wherein the regression analysis is a linear regression analysis.

17. The one or more non-transitory computer-readable media of claim 14, wherein:

the variance that characterizes distribution, relative to the model, includes the one or more parameters and the previous execution times associated with individual executions of the plurality of data queries.

18. The one or more non-transitory computer-readable media of claim 14, further comprising:

one or more services are further configured to access the execution time data describing one or more recent execution times of the data query executing on the one or more data storage systems within a recent period of time; and wherein the second predicted execution time of the data query is further based on the one or more recent execution times of the data query.

19. The one or more non-transitory computer-readable media of claim 14, wherein the one or more data storage systems are managed at least partly using a relational database management system (RDBMS).

20. The one or more non-transitory computer-readable media of claim 14, the actions further comprising:

executing the data query on the one or more data storage systems; and terminating the data query based on a determination that the executing of the data query exceeds the time period.

* * * * *

UNITED STATES PATENT AND TRADEMARK OFFICE
CERTIFICATE OF CORRECTION

PATENT NO. : 10,133,775 B1
APPLICATION NO. : 14/219802
DATED : November 20, 2018
INVENTOR(S) : Harsha Ramalingam and Ramanathan Muthiah Page 1 of 1

It is certified that error appears in the above-identified patent and that said Letters Patent is hereby corrected as shown below:

On the Title Page

Item (56) References Cited add:
2014/0214880 A1* 07/2014 Chi G06F 17/30442

Signed and Sealed this
Twenty-ninth Day of January, 2019

Andrei Iancu
*Director of the United States Patent and Trademark Office*